Oct. 27, 1970 E. A. PFEIFFER 3,536,836

ACOUSTICALLY ACTUATED SWITCH

Filed Oct. 25, 1968

INVENTOR.
ERICH A. PFEIFFER

BY Allan M. Shapiro

ATTORNEY

United States Patent Office 3,536,836
Patented Oct. 27, 1970

3,536,836

ACOUSTICALLY ACTUATED SWITCH

Erich A. Pfeiffer, Los Angeles, Calif.
(8730 Orion Ave., Sepulveda, Calif. 91343)

Filed Oct. 25, 1968, Ser. No. 770,540
Int. Cl. H01h *35/24*
U.S. Cl. 179—1 9 Claims

ABSTRACT OF THE DISCLOSURE

An acoustically actuated switch having a threshold adaptive to the environmental ambient noise level, and responsive to a sharp acoustic impulse of greater amplitude than the ambient. The switch comprises a microphone exhibiting capacitive source impedance connected between the base and emitter of a transistor having small base leakage current. A power source is connected in series with a load resistor between the collector and emitter of the transistor. An appropriate switching device, e.g., a flip-flop, connected to the collector of the transistor is triggered by the collector current pulse resulting when the microphone senses an appropriate acoustic impulse.

BACKGROUND OF THE INVENTION

Field of the invention

The present invention relates to an acoustically actuated switch and, more particularly, to an acoustically actuated switch capable of adapting its threshold level to the environmental acoustic ambient noise level, the switch being actuated by the occurrence of an acoustic impulst of amplitude greater than the environmental ambient.

Description of the prior art

Acoustically actuated switches have found widespread acceptance for the remote control of various household appliances, most notably for the remote control of television receivers or electronic garage door openers. However, the complexity of the acoustically actuated switches utilized for these purposes have made them prohibitively costly for the control of inexpensive devices such as transistor radios, children's toys, electric lamps and the like. It is primarily for such low cost applications that the present invention is directed.

The acoustically actuated switches in most widespread use today are of the type which are sensitive to sounds of supersonic frequency. In such stystems, a handheld or car mounted transmitter generates a supersonic acoustic signal which may be frequency modulated. A receiver, typically included in a television receiver or mounted adjacent a garare door, includes a microphone and amplifier sensitive to the supersonic frequency transmitted. In simple embodiments, the receiver merely amplifies and detects the supersonic signal, using the resultant voltage to operate a relay. The relay switch contacts then are used to change channels of a television set or turn on a motor to operate the garage door. In more sophisticated embodiments, the receiver may include appropriate frequency or phase discrimination circuits to insure switch actuation only by a signal having preselected frequency modulation characteristics.

While such frequency-sensitive acoustically actuated switches have received relatively widespread acceptance for certain application, the complexity of the tuned receiver and the necessity for providing a tone-generating transmitter have made these prior are devices too costly for the control of inexpensive items.

Another type of prior art acoustically actuated switch is that responsive to a spoken voice. These devices, while not requiring a transmitter, do involve circuitry of considerable sophistication, typically including filters responsive to the asymmetry of the positive and negative envelope peak signals characteristic of human speech, or sensitive to particular voiced sounds or formants which permit discrimination between the spoken voice and sounds generated by machinery or other sources.

While a few simple acoustically actuated switches have been suggested in the past, these have all exhibited certain shortcomings. For example, the voice operated relay stystem described by Hill in U.S. Pat. No. 2,980,827 employs an audio frequency amplifier to amplify, prior to detection by a rectifier, acoustic signals picked up by a microphone. The detected amplified signal is then fed to a circuit, similar to a Miller integrator, utilizing negative feedback. This circuit functions to energize a relay rapidly when a sound is detected, with slow release of the relay so that the relay will not drop out during the brief intervals of silence typically encounteed in human speech.

The objective of the Hill device is to energize a piece of equipment, typically voice transmitting circuits, only during the period when a person is speaking. While useful for this purpose, the device is not directly applicable to simple on-off control of a radio, toy or the like, and the necessity for an audio amplifier and rectifier may make its cost prohibitive for such applications. Moreover, the Hill circuit is not adaptively sensitive to changes in environmental acoustic ambient noise level.

Another prior art approach to acoustic switch control is typified by the sound operated relay of Conn described in U.S. Pat. No. 2,391,882. In this device, the amplified signal detected by a microphone is directed to a differentiation circuit, comprising a capacitor and resistor, and typically having a time constant on the order of 2.5 microseconds. The differentialted pulse is fed via a first diode to the grid of a triode amplifier. The plate circuit is connected to a relay which then is enerigized upon the occurrence of a sharp acoustic impulse. A pair of contacts of the relay are used to disconnect the output of the differentiation circuit from the first diode and to connect it via an oppositely poled diode to the grid of the same triode amplifier. Appropriate biasing of the amplifier keeps the relay energized until the next occurrence of an acoustic burst. When such an impulse occurs, the opposite polarity signal fed via the second diode causes the amplifier to cease conduction, thereby deenergizing the relay.

The Conn sound operated relay is not adaptive to the environmental ambient noise level. Moreover, since the differentiation circuit has a very short time contsant (on the order of 2.5 microseconds resulting from the use of a capacitor of about .0005 microfarad and a resistor on the order of 500 ohms), the capacitor will rapidly discharge after each peak of the input signal. Both positive and negative signal excursions will result in current flow through the Conn differentiator capactior, hence the net charge on the capacitor will be zero. As a result, should the acoustic control signal comprise repeated bursts, corresponding pulses will occur at the output of the differentiation circuit which may cause undesired multiple triggering of the Conn relay.

The foregoing and other shortcomings of the prior art are overcome by the inventive acoustically actuated switch which adaptively compensates for changes in the acoustic environmental ambient noise level, and which is actuated in response to a sharp acoustic burst such as the clap of a hand or the snap of a finger. The inventive circuit utilizes few components, hence is very inexpensive, and is not subject to multiple triggering.

SUMMARY OF THE INVENTION

The inventive acoustically actuated switch comprises a crystal or like microphone exhibiting capacitive source impedance connected between the base and emitter of a transistor having small base leakage current. A source of power is connected in series with a load resistor between the collector and emitter of the transistor. A conventional switching device, connected to the collector of the transistor, is triggered by the collector current pulse resultant when an acoustic impulse having an amplitude greater than the environmental acoustic ambient noise level is detected by the microphone.

In operation, the base-emitter circuit of the transistor may be analogized to a highly nonlinear resistor whereby, when an initial acoustic impulse is detected, the microphone capacitive source impedance and the initially low base-emitter resistance form a differentiation circuit passing a pulse which is amplified by the transistor. As the input signal voltage maximum is reached, the effective base-emitter circuit resistance of the transistor increases greatly, resulting in charge being stored by the effective capacitance of the microphone. Successive ambient noise level signal peaks of the same polarity function to maintain the charge level on this capacitance, and are not amplified by the circuit.

Gradual changes in the acoustic environmental ambient noise level will cause corresponding changes in the charge level on the microphone effective capacitance and hence on the bias of the transistor. A sharp rise time acoustic impluse of amplitude substantially greater than the environmental ambient noise level will bias the transistor momentarily into conduction, providing a collector current pulse which will trigger the switching device. However, this acoustic burst also will increase the residual charge level on the microphone effective capacitance, thereby insuring that multiple triggering of the circuit will not occur if the acoustic impulse comprises several pulses.

In an alternative embodiment, a complementary transistor is connected between the source of power and the base of the first transistor, the collector of the first transistor being resistively coupled to the base of the complentary transistor. This embodiment provides positive feedback, increasing the sensitivity of the circuit. Moreover, in this embodiment, the circuit remains in the switched state until appropriately reconditioned.

Thus, it is an object of the present invention to provide an improved acoustically actuated switch.

It is another object of the present invention to provide an acoustically actuated device having a minimum of components.

Another object of the present invention is to provide an acoustically actuated switch sensitive to an acoustic impulse of amplitude greater than the environmental acoustic ambient noise level.

It is a further object of the present invention to provide an acoustically actuated switch which adaptively compensates for changes in acoustic environmental ambient noise level.

Yet another object of the present invention is to provide an acoustically actuated switch the stable state of which is changed by occurrence of an acoustic impulse. Still other objects, features and attendant advantages of the present invention, together with various modifications, will become apparent to those skilled in the art from a reading of the following detailed description of the preferred embodiments constructed in accordance therewith, taken in conjunction with the accompanying drawings wherein like numerals designate like parts in the several figures.

DESCRIPTION OF THE PREFERRED EMBODIMENTS

Figure 1:
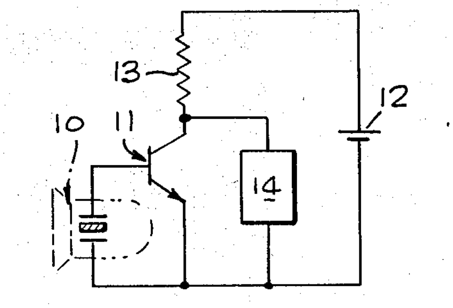
FIG. 1 is an electrical schematic diagram of one embodiment of the inventive acoustically actuated switch.

Referring now to the drawings, and more particularly to FIG. 1 thereof, there is shown an electrical schematic diagram of an acoustically actuated switch in accordance with the present invention. The inventive switch comprises a microphone 10 of the type exhibiting capacitive source impedance. Microphone 10, which typically may be of the piezoelectric crystal variety, is connected between the base and emitter of a transistor 11. A source of power, for simplicity herein illustrated as a battery 12, is series connected with a load resistor 13 between the collector and emitter of transistor 11. An appropriate conventional switching device 14, described more fully hereinbelow, also is connected between the collector and emitter of transistor 11.

While transistor 11 (see FIG. 1) is illustrated as being of the NPN type, this is not required, and a PNP transistor may be utilized, so long as battery 12 is connected with the appropriate polarity. However, for proper functioning of the circuit, transistor 11 should be of the type exhibiting small base leakage current.

Figure 2:
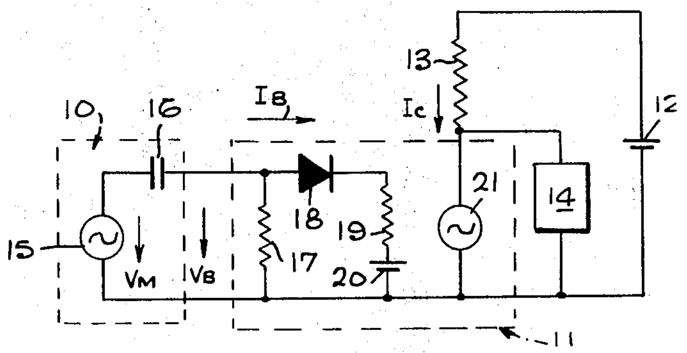
FIG. 2 is a schematic diagram representing an electrical equivalent of the circuit illustrated in FIG. 1.

The circuit shown in FIG. 2 is an electrical equivalent of that shown in FIG. 1, and represents the electrical charatceristics of microphone 10 and transistor 11. In particular, crystal microphone 10 may be characterized as comprising a voltage generator 15 in series with a capacitor 16. In an open circuit, generator 15 develops a voltage $V_M$ across its terminals. Of course, capacitor 16 represents the capactive source impedance of microphone 10, typically on the order of one thousand to several thousand picofarads.

As shown in FIG. 2, the input or base-emitter of transistor 11 may be characterized as comprising a first resistor 17 connected in parallel with a series connected ideal diode 18, a second resistor 19, and a bias battery 20. Resistor 19 represents the input impedance of transistor 11 in its active region, and typically is on the order of several thousand ohms. Bias battery 20 represents the contact potential of the base-emitter junction, about 0.6 volt for a silicon transistor at room temperature. Resistor 17 indicative of the base leakage current path, and typically is on the order of several hundred megohms for a silicon transistor. The base-emitter voltage of transistor 11 is designated $V_B$.

The collector circuit of transistor 11 may be characterized as comprising a current generator 21 providing a collector current $I_C$ proportional to the base current $I_B$, but larger by the current gain $h_{FE}$ of transistor 11.

When a sound wave is sensed by microphone 10, an electrical signal is developed across the microphone terminals. When the positive excursions of peaks of this signal exceed the voltage of bias battery 20, diode 18 begins to conduct. As long as diode 18 is conducting, resistor 19 and capacitor 16 together form a differentiation network. Therefore, the base current $I_B$ which flows through diode 18 in the forward direction is approximately proportional to the time derivative of the open circuit voltage $V_M$ of microphone 10. This condition persists only so long as the derivative is positive and its magnitude exceeds the voltage of bias battery 20. As the voltage $V_M$ approaches its peak amplitude, the derivative voltage will decrease, and diode 18 will cease conduction. At this instant, the voltage $V_B$ will equal the voltage of bias battery 20, and the difference between the voltages $V_M$ and $V_B$ will appear across capacitor 16.

As $V_M$ now decreases, the voltage across capacitor 16 cannot change rapidly. This results because diode 18 is back-biased, hence capacitor 16 can only discharge through resistor 17, which resistor has a much larger value than does resistor 19. The voltage across capacitor 16 therefore remains approximately constant and, when $V_M$ equals zero, $V_B$ will be approximately equal to minus the positive peak voltage of $V_M$ less the voltage of bias battery 20.

Under this condition ($V_M=O$), diode 18 is backbiased by a votlage approximately equal to the highest positive signal amplitude that has occurred. Diode 18 can become conducting again only if the bias voltage is exceeded, that is, if the amplitude of a successive positive peak of the microphone signal voltage exceeds the previous one, or after the charge across capacitor 16 has dissipated. For the typical values of capacitor 16 and resistor 17 noted, the time constant of this combination is on the order of several hundred milliseconds. Thus, with the typical acoustic ambient or background noise present in a room, only the highest peaks of the signal will cause diode 18 to conduct biefly in order to replenish the charge on capacitor 16; most of the time the signal amplitude will be below the bias voltage.

The base voltage $V_B$ will follow the signal amplitude $V_M$ very closely provided this amplitude does not change too abruptly. However, when a signal occurs whose amplitude substantially exceeds the previous background noise level, and which has a fast onset or steep rise time, the first positive halfwave will result in a large current $I_B$ pulse. In turn, a corresponding output pulse $I_C$ will occur through load resistor 13 in the collector circuit of transistor 11. This pulse in turn may be used to trigger switching device 14.

Figures 3A, 3B, 3C:
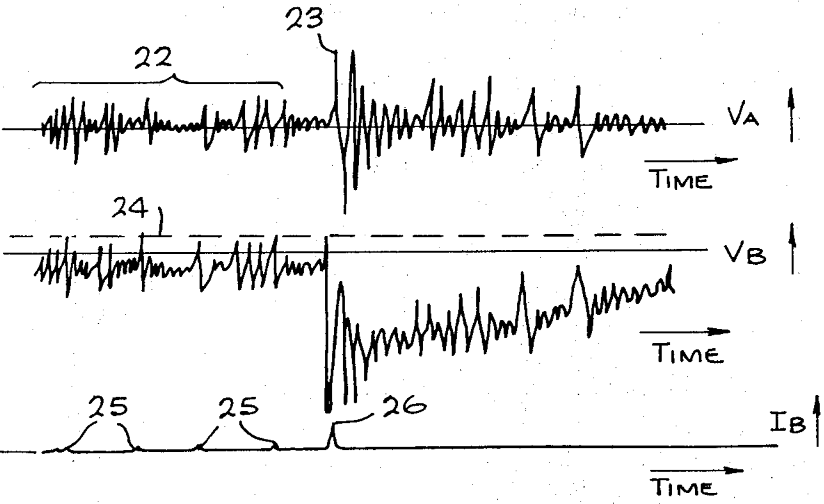
FIG. 3*a* is a graph of the voltage $V_M$ generated across the microphone utilized in the circuit of FIG. 1, shown as a function of time. The wave shapes illustrated are typical of room environmental acoustic ambient noise, and of an acoustic impulse such as may be used to actuate the inventive circuit.
FIG. 3*b* is a graph of the voltage $V_B$ at the base of the transistor of the circuit of FIG. 1 resulting from occurrence of the microphone voltage $V_M$ shown in FIG. 3*a*.
FIG. 3*c* is a graph of the current $I_B$ flowing in the base-emitter circuit of the transistor of the circuit of FIG. 1 resulting from occurrence of the voltage $V_M$ illustrated in FIG. 3*a*. With a different ordinate scale factor, the graph also represents the current $I_C$ flowing in the collector of the transistor of the circuit of FIG. 1.

FIGS. 3*a*, 3*b* and 3*c* shows waveforms illustrating the operation of the circuit of FIG. 1 or the equivalent circuit of FIG. 2. In particular, FIG. 3*a* illustrates a typical waveform of microphone voltage $V_M$ as a function of time. In the illustrative example, the signal present during time period 22 represents typical environmental acoustic ambient noise which may be present in a room. The burst 23 represents a steep rise time acoustic pulse such as may be produced by a sharp clap of the hands or snap of the fingers. Note that the maximum amplitude of impulse 23 significantly exceeds the average impulse level of the ambient noise present during period 22.

As illustrated in FIG. 3*b*, line 24 represents the contact potential of the base-emitter junction of transistor 11; that is, line 24 represents the voltage of equivalent bias battery 20. During the time period 22 during which only ambient noise reaches microphone 10, the bias voltage $V_B$ follows the signal $V_M$. Notice, however, that the average value of $V_B$ is negative, and that only the positive peaks of the noise signal reach or slightly exceed the voltage level 24 of bias battery 20. When acoustic burst 23 occurs, the resultant charge deposited on capacitor 16 drives the base voltage $V_B$ strongly negative. Subsequent signal peaks do not exceed the level of bias battery 20 until capacitor 16 has slowly discharged through resistor 17.

FIG. 3*c* shows the base current $I_B$ of transistor 11 (i.e., the current $I_B$ through diode 18) corresponding to the microphone signal voltage $V_M$ shown in FIG. 3*a*. With a different ordinate scale, the curve of FIG. 3*c* also represents the collector current $I_C$ of transistor 11. Note that the peaks 25 represent current impulses through diode 18 corresponding to the maximum amplitude peaks of the noise signal $V_M$ during time period 22. Of course, it is during the occurrence of these pulses 25 that the charge on capacitor 16 is replenished. Note that the magnitude of the pulses 25 is insufficient to cause triggering of switching device 14. At the occurrence of acoustic impulse 23, a large current burst 26 occurs. The corresponding collector current pulse is of sufficient magnitude to trigger switching device 14.

Switching device 14 may comprise any conventional circuit or device adapted to be triggered by a short pulse. For example, switching device 14 may comprise a flipflop circuit, the state of which will be alternated by consecutive acoustic bursts 26. Alternatively, switching device 14 may comprise one or more silicon controlled rectifiers, or a relay and appropriate relay control circuitry well known to those skilled in the art.

Figure 4:
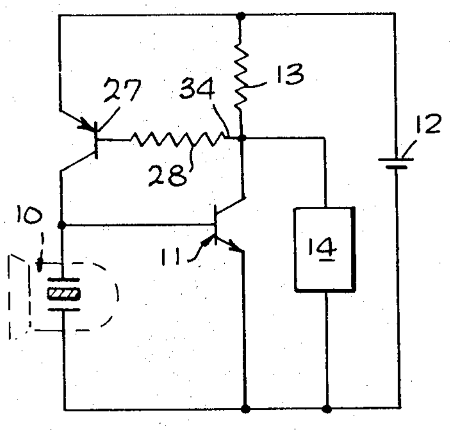
FIG. 4 is an electrical schematic diagram of an alternative embodiment of the inventive acoustically actuated switch, and employing positive feedback.

An alternative embodiment of the inventive acoustically actuated switch is illustrated in FIG. 4; this embodiment, utilizing positive feedback, exhibits greater sensitivity than does the basic circuit of FIG. 1. Note that microphone 10, transistor 11, power source 12, load resistor 13 and switching device 14 illustrated in FIG. 4 all correspond exactly to the like numbered components in the circuit of FIG. 1. The modification of FIG. 4 comprises the addition of a positive feedback circuit including a transistor 27 and a feedback resistor 28.

Transistor 27 (see FIG. 4) is of opposite polarity from that of transistor 11. Thus as illustrated, transistor 11 is of the NPN type, while transistor 27 is of the PNP type. For proper operation of the circuit, transistor 27 should be of the type having small base leakage current. As illustrated in FIG. 4, the emitter of transistor 27 is connected to the junction of battery 12 and resistor 13, while the collector of transistor 27 is connected to the base of transistor 11. Resistor 28 is connected between the collector of transistor 11 and the base of transistor 27.

Figure 5:
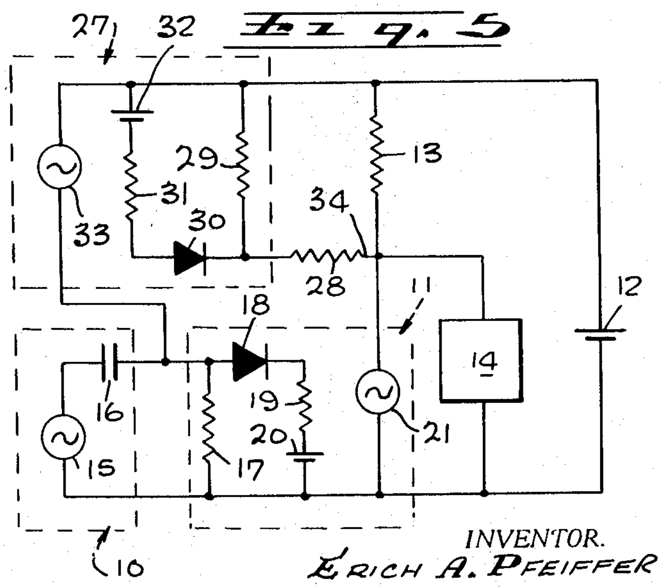
FIG. 5 is a schematic diagram representing an electrical equivalent of the circuit of FIG. 4.

The circuit shown in FIG. 5 is the electrical equivalent of the circuit shown in FIG. 4. Note in FIG. 5 that the components representing microphone 10 and transistor 11 correspond identically to the like numbered components in FIG. 2.

As indicated in FIG. 5, transistor 27 may be characterized as comprising a resistor 29 connected in parallel with a series connected ideal diode 30, a resistor 31, and a battery 32. Resistor 29 may be identified with the base leakage current of transistor 27, and typically is on the order of several hundred megohms for a silicon transistor. Resistor 31 represents the input impedance of the transistor in its active region, typically on the order of several thousand ohms. Bias battery 32 represents the contact potential of the base-emitter junction of transistor 27, typically about 0.6 volt for a silicon transistor at room temperature. The collector circuit of transistor 27 may be characterized as comprising a current generator 33 providing a collector current proportional to the base current but larger by the current gain $h_{FE}$ of transistor 27.

The interaction between crystal microphone 10 and transistor 11 shown in FIG. 5 is identical to that previously desrcibed in conjunction with FIGS. 1 and 2. Transistor 27 normally is not conducting and does not affect the operation of microphone 10 and transistor 11, as long as the current pulses in the collector of transistor 11 cause only a small voltage drop across load resistor 13. However, if the voltage drop across resistor 13 exceeds the bias voltage represented by battery 32, a current begins to flow in the base circuit of transistor 27. This results in a current in the collector of transistor 27 having the same direction as the current provided by generator 15. Thus, positive feedback is provided which drives both transistors 11 and 27 into saturation. Resistor 28 operates to prevent excessive base current in transistor 27 when transistor 11 becomes saturated. Thus, the feedback circuit comprising resistor 28 and transistor 27 supplements the basic signal discrimination process by providing greater sensitivity; for an acoustic signal burst of given amplitude, the resultant transistor 11 collector current pulse in the embodiment of FIG. 4 will be greater than the corresponding collector current pulse in the embodiment of FIG. 1.

Note that the circuit of FIG. 4 also has the property of a memory since, once turned on, the two transistors 11 and 27 remain in the conducting state until the circuit is reconditioned. Depending on the particular application of the inventive switch and on the type of switching device 14 utilized, the circiut of FIG. 4 may be returned to its original state in any of several different ways. For example, if a capacitor (not shown in FIGS. 4 and 5) were connected in line 34 in series with resistor 28, transistors 27 and 11 will remain saturated only until this capacitor 34 has been charged, whereupon the circuit will return to its original state. The signal at the collector of transistor 11 therefore would be a negative going pulse having a duration that is determined by the magnitude of resistor 28 and such capacitor 34 in series with resistor 28.

If the circuit of FIG. 4 is to be used to control operation of a mechanical apparatus, a set of contacts opearted by the apparatus may be used to reset the circuit when the desired mechanical opeartion is complete. Such reconditioning may be accomplished, for example, by briefly disconnecting the supply voltage (i.e., battery 12) or by briefly shortcircuiting the base and emitter of one of transistors 11 and 28.

In summary, the inventive acoustically actuated switch comprises a microphone exhibiting capacitive source impedance connected between the base and emitter of a tarnsistor having small base leakage current. The cooperation of the two components is such as to provide a circuit which adapts its actuation threshold to the environmental acoustic ambient noise level, and which will be actuated only by a sharp rise time acoustical impulse of amplitude greater than the background noise. The transistor collector current pulse resultant from such acoustic impulse then may be used to trigger a conventional switching device.

What is claimed is:

1. An acoustically actuated switch having an actuation threshold adaptive to the environmental acoustic ambient noise level and responsive to acoustic impulses of amplitude greater than said ambient noise level, said switch comprising, in combination:

a microphone exhibiting capacitive source impedance;

a first transistor having small base leakage current, said microphone being connected directly between the base and emitter of said first transistor, the base of said first transistor being otherwise unbiased;

a load resistor;

a source of power connected via said load resistor to the collector of said first transistor; and switching means connected to the collector of said first transistor, and adapted to be triggered by a current pulse therefrom.

2. An acoustically actuated switch as defined in claim 1 wherein said microphone is of the crystal variety.

3. An acoustically actuated switch as defined in claim 2 wherein said switching means comprises either a flip-flop or a silicon controlled rectifier.

4. An acoustically actuated switch as defined in claim 1 further comprising:

a second tarnsistor of conductivity type opposite that of said first transistor, the collector of said second transistor being connected directly to the base of said first transistor, the emitter of said second transistor being connected to said source of power; and a feedback resistor, said resistor being connected between the collector of said first transistor and the base of said second transistor.

5. An acoustically actuated switch as defined in claim 4 further comprising:

a capacitor connected in series with said feedback resistor between the collector of said first transistor and the base of said second transistor.

6. An acoustically actuated switch of the type responsive to sharp rise time acoustic bursts of amplitude greater than the environmental acoustic ambient noise level, said switch comprising:

a microphone exhibiting a capacitance on the order of one thousand to several thousand picofarads;

an unbiased first transistor having small base leakage current, said microphone being connected directly between the base and the emitter of said transistor;

a load resistor, one terminal of said resistor being connected to the collector of said first transistor;

a source of power connected between the other terminal of said load resistor and the emitter of said first transistor; and switching means connected across the collector and emitter of said first transistor and triggered by a current pulse therefrom, whereby ambient noise peaks detected by said microphone will maintain charged said microphone capacitance, so that only an acoustic impulse of amplitude greater than the environmental acoustic ambient noise level will cause conduction of said first transistor and resultant triggering of said switching means.

7. An acoustically actuated switch as defined in claim 6 wherein said microphone is of the piezoelectric crystal type.

8. An acoustically actuated switch as defined in claim 6 wherein the time constant of said microphone capacitance and the input impedance of said first transistor is on the order of 100 milliseconds.

9. An acoustically actuated switch as defined in claim 6 further comprising:

a second transistor having small base leakage current and of a conductivity type opposite that of said first transistor, the collector of said second tarnsistor being connected directly to the base of said first transistor, the emitter of said second transistor being connected to said source of power; and a feedback resistor connected between the collector of said first transistor and the base of said second transistor, said feedback resistor and said second transistor together providing positive feedback.

References Cited

UNITED STATES PATENTS 3,171,085 2/1965 Vallese ------------- 330—17

FOREIGN PATENTS 945,192 12/1963 Great Britain.

KATHLEEN H. CLAFFY, Primary Examiner

D. W. OLMS, Assistant Examiner